(12) United States Patent
Ritter

(10) Patent No.: US 6,363,265 B1
(45) Date of Patent: Mar. 26, 2002

(54) VOLUME CONTROL FOR AN ALERT GENERATOR

(75) Inventor: Kai-Uwe Ritter, Roth (DE)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/294,166

(22) Filed: Apr. 19, 1999

(51) Int. Cl.[7] .............................. H04B 1/38; H04M 1/00
(52) U.S. Cl. ....................................... 455/567; 455/550
(58) Field of Search ................................ 455/567, 550, 455/67.6

(56) References Cited

U.S. PATENT DOCUMENTS 6,044,279 A * 3/2000 Hokao et al. ............... 455/567
6,108,558 A * 8/2000 Vanderspool, II ........... 455/456

FOREIGN PATENT DOCUMENTS

GB          0 507 482 A2    7/1992    .......... H04M/19/04

* cited by examiner

*Primary Examiner*—Vivian Chang
*Assistant Examiner*—James K Moore
(74) *Attorney, Agent, or Firm*—John A. Ligon

(57) ABSTRACT

An apparatus and method for controlling the volume of a device's user alert sound based on an analysis of the device's environment. The device emits a signal and receives a resulting reflected signal. A processor measures characteristics such as the amplitude and/or delay of the reflected signal to determine the type of environment in which the communication device is located. The volume of the alert sound is then adjusted based on the type of environment indicated by the characteristics of the reflected signal. For example, if the characteristics indicate a closed environment, such as a briefcase, the volume is adjusted to high level, and if the characteristics indicate an open environment such as a desktop, the volume is adjusted to a low level.

21 Claims, 1 Drawing Sheet

VOLUME CONTROL FOR AN ALERT GENERATOR

TECHNICAL FIELD

The present invention relates generally to the field of telephones and more particularly to telephones controlling the volume of an alert.

BACKGROUND OF THE INVENTION

Telephones have a ringing tone or other user alert sound that indicates when there is an incoming call. In some telephones the volume of the ringing tone is adjustable so that it can be audible in different environments having different noise levels.

One type of telephone that has an adjustable volume of the ringing tone is shown in European patent application EP 0 507 482 A2. European patent application EP 0 507 482 A2 discloses a telephone in which a circuit detects the level of an ambient noise signal and produces a detection signal responsive to the ambient noise signal. The detection signal is then used to produce a control signal that controls the ringing tone volume.

The above-described technique for controlling ringing tone volume suffers from a disadvantage. If the telephone is kept in a depository like a briefcase or in the pocket of a coat or jacket, the ringing tone will not be audible. This problem occurs because the ringing tone volume will be adjusted to a low level based on the low ambient noise in the depository.

SUMMARY OF THE INVENTION

The present invention solves the above described problem by controlling the volume of a device's user alert sound based on an analysis of the device's environment. In one embodiment, the device emits a sound and receives a resulting reflected sound. A processor measures characteristics such as the amplitude and/or delay of the reflected sound to determine the type of environment in which the device is located. The volume of the user alert sound is then adjusted based on the type of environment indicted by the characteristics of the reflected sound. For example, if the characteristics indicate a closed environment such as a brief case, the volume is adjusted to a high level, and if the characteristics indicate an open environment such as a desk top, the volume is adjusted to a low level.

DETAILED DESCRIPTION

Figure 1:
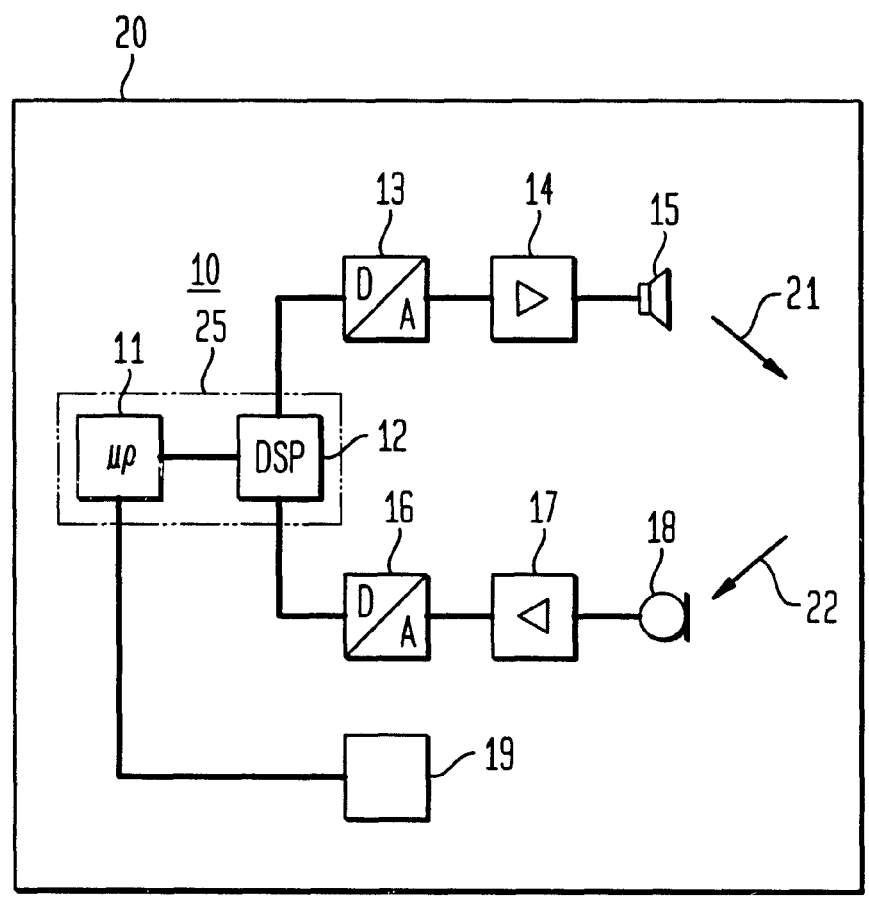
FIG. 1 is a block diagram of an embodiment of the present invention.

FIG. 1 is a block diagram of telephone 10, such as cellular or a wireless telephone. Although the present embodiment of the invention is being illustrated with the use of a telephone, this should not be construed to limit the present invention to telephones. The present invention may equally be applicable to any device that has an alert, such as a palm computer, or a watch.

Telephone 10 has a processor 25. Processor 25 can be any processor, such as a microcomputer, microprocessor 11, digital signal processor 12, or any combination of the foregoing. Although, processor 25 is shown in FIG. 1 as having both microprocessor 11 and digital signal processor 12, processor 25 may include only one of the two devices, and the functionality that is ascribed to microprocessor 11 and digital signal processor 12 is performed by the one device. Telephone 25 also has digital to analog converter 13, speaker amplifier 14, speaker 15, microphone 18, microphone amplifier 17, analog to digital converter 16 and ringer 19. Telephone 10 may also include other elements (not shown) such as an antenna and a transceiver.

When telephone 10 receives a call, microprocessor 11 instructs digital signal processor 12 to analyze telephone 10's environment to determine, for example, if the telephone is in a depository 20 such as a briefcase or a pocket of a coat. Microprocessor 11 then generates a control signal to activate ringer 19 to alert a user that there is an incoming call. Microprocessor 11 instructs digital signal processor 12 to analyze telephone 10's environment in order to ensure that the sound generated by ringer 19 is audible to the user. Digital signal processor 12 performs this analysis when a new incoming call is detected, but before activating ringer 19.

To analyze the location of telephone 10, digital signal processor 12 generates digital measuring signals. The digital measuring signals are converted to analog signals by digital to analog converter 13, amplified by speaker amplifier 14 and converted to an acoustic signal 21 by speaker 15. To avoid disturbance to the user, the measuring signals may be chosen in such a way that the generated acoustic signal 21 is in a frequency range that is not audible to the user. Acoustic response signal 22 is received by microphone 18. Microphone 18 converts acoustic response signal 22 to an analog signal that is provided to microphone amplifier 17. The amplified signal is converted to a digital signal by analog to digital converter 16 and fed to digital signal processor 12. Digital signal processor 12 analyses the digital samples of the response signal to determine the location of telephone 10.

When telephone 10 is kept in a depository such as a briefcase or pocket, the response signal is received by digital signal processor 12 having a short delay referenced to the time at which the measuring signal was generated. The delay is in proportion with an impulse response of the space surrounding telephone 10. Long delay times, such as any delay time above about 0.92 milli-seconds (ms), characterize a wider space and short delay times, such as any delay time below about 0.92 ms, characterize a closed space such as a briefcase or a pocket.

In addition, the attenuation of the response signal may be analyzed by digital signal processor 12, to further characterize the telephone's environment. Response signals having characteristics such as a short delay and strong attenuation, such as above about 50%, indicate that the telephone is in a depository that is highly sound absorbent, such as a pocket of a coat or a jacket. Response signals having a short delay and weak attenuation, such as below about 50%, indicate a depository such as a briefcase that is absorbs sound to a lesser degree. Response signals having a long delay indicate an open space.

The result of the analysis of digital signal processor 12 is used by microprocessor 11 to adjust the volume of the ringing tone produced by ringer 19. For short delays and strong attenuation the volume is set at a high level, for short delays and weak attenuation the volume is set at a medium level, and for long delays the volume is set at a lower level.

Microprocessor 11 can also adjust the volume of ringer 19 using volumes that are correlated to delay times. For example, a table containing ringing tone volume values corresponding to delay times can be stored in a memory that is accessible to microprocessor 11. Digital signal processor 12 passes the delay time to microprocessor 11, which uses the delay time to look up the corresponding ringing tone value from the table.

The analyzing and adjusting process as described above can be repeated after each ringing tone or after a given number of ringing tones to produce a comfortable ringing tone volume. This avoids overly loud ringing when a high volume value is initially selected by microprocessor 11, for example, when the telephone was originally in a depository and is then taken out of the depository.

If telephone 20 has a vibrator, the vibrator may be activated by microprocessor 11 at the time of an incoming call when the characteristics of response signal 22 indicate that the telephone is in a pocket. For example, when the time delay is below a time delay threshold of about 0.46 ms and the attenuation exceeds an attenuation threshold of about 50% the vibrator would be activated. Additionally, a temperature sensor can be coupled to microprocessor 11. If the temperature sensor measures a temperature close to the temperature of the human body, the vibrator may be activated.

It should be noted that instead of a ringer 19, speaker 15 may be used to produce the ringing tone. Additionally, although the alert has been illustrated as a ringing tone, the alert can be any audio signal, such as a prerecorded voice.

While the invention has been described with reference to a preferred embodiment, it will be understood by those skilled in the art having reference to the specification and drawings that various modifications may be made and various alternatives are possible therein without departing from the spirit and scope of the invention.

What is claimed is:

1. A device comprising:
   an alert generator that generates an alert having a controllable volume;
   means for injecting a signal into an ambient environment for the device;
   a detector for detecting a reflection of the injected signal, and
   a processor coupled to the injection means, the detector and the alert generator operable to perform an analysis of the detected signal to thereby determine a parameter differential between the injected signal and the detected signal, wherein the parameter differential provides an indicia of a sound transmission characteristic for the ambient environment of the device, and wherein the processor further operates to control the volume of the alert as a function of the indicia.

2. The device according to claim 1, wherein the parameter differential is a delay time and the processor operates to control the volume of the alert responsive to the delay time.

3. The device according to claim 2, wherein the processor comprises a memory for storing a table of alert volume values corresponding to delay times.

4. The device according to claim 1, wherein the parameter differential is signal attenuation and the processor operates to control the volume of the alert responsive to the attenuation.

5. The device according to claim 4, further comprising a vibrator, wherein the vibrator is activated responsive to a time delay between the injected signal and the detected signal being below a time delay threshold and the attenuation of the detected signal exceeding an attenuation threshold.

6. The device according to claim 1, further including a means for detecting incoming calls to the device and wherein the processor performs the analysis and controls the volume at the beginning of each incoming call before the alert generator generates the alert.

7. The device according to claim 1, wherein the processor performs the analysis and controls the volume before the alert generator generates each alert.

8. The device according to claim 1, wherein:
   the alert generator generates one or more groups of alerts each having a plurality of alerts; and
   the processor performs the analysis and controls the volume before the alert generator generates each group of alert.

9. The device according to claim 1, wherein the alert generator is a ringer.

10. The device according to claim 1, wherein the processor is a microprocessor.

11. The device according to claim 1, wherein the processor is a digital signal processor.

12. A method for generating and controlling an alert on a device, the method comprising the steps of:
    injecting a signal into an environment proximate to the device;
    detecting a reflection of the injected signal;
    analyzing the detected signal to determine a parameter differential between the injected signal and the detected signal, wherein the parameter differential provides an indicia of a sound transmission characteristic for the proximate environment of the device;
    adjusting the volume of the alert as a function of the indicia; and
    generating the alert.

13. The method according to claim 12, wherein the parameter differential is a delay time between the injected signal and the detected signal.

14. The method according to claim 13, wherein the step of adjusting the volume of the alert comprises the steps of:
    increasing the volume of the alert responsive to a short delay time; and
    decreasing the volume of the alert responsive to a long delay time.

15. The method according to claim 13, wherein:
    the step of analyzing the detected signal further includes a determination of an attenuation of the detected signal relative to the injected signal and
    the step of adjusting the volume of the alert comprises the substeps of:
      setting the volume of the alert to a high level responsive to a short delay time and strong attenuation;
      setting the volume of the alert to a medium level responsive to a short delay time and weak attenuation; and
      setting the volume of the alert to a low level responsive to a long delay time.

16. The method according to claim 15,
    wherein the device includes a vibrator; and
    the method further comprises the step of activating the vibrator responsive to the time delay being below a time delay threshold and the attenuation of the detected signal exceeding an attenuation threshold.

17. The method according to claim 13, wherein the step of adjusting the volume of the alert comprises the steps of:
    obtaining the alert volume from a table of alert volume values corresponding to delay times; and
    adjusting the volume of the alert to the alert volume value obtained from the table.

18. The method according to claim 12, wherein the step of analyzing the detected signal includes an analysis of an attenuation of the detected signal relative to the injected signal.

19. The method according to claim 12, wherein the alert is provided in response to an incoming call to the device and further wherein the step of analyzing the detected signal is performed for each incoming call prior to generating the alert.

20. The method according to claim 12, wherein the step of analyzing the detected signal is performed prior to generating each alert.

21. The method according to claim 12, wherein:
    the step of generating the alert includes generating one or more groups of alerts each having a plurality of alerts; and
    the step of analyzing the detected signal is performed prior to generating each group of alerts.

* * * * *